Aug. 25, 1964
W. G. McKENZIE
3,145,804
LUBRICATOR
Filed Nov. 24, 1961
4 Sheets-Sheet 1
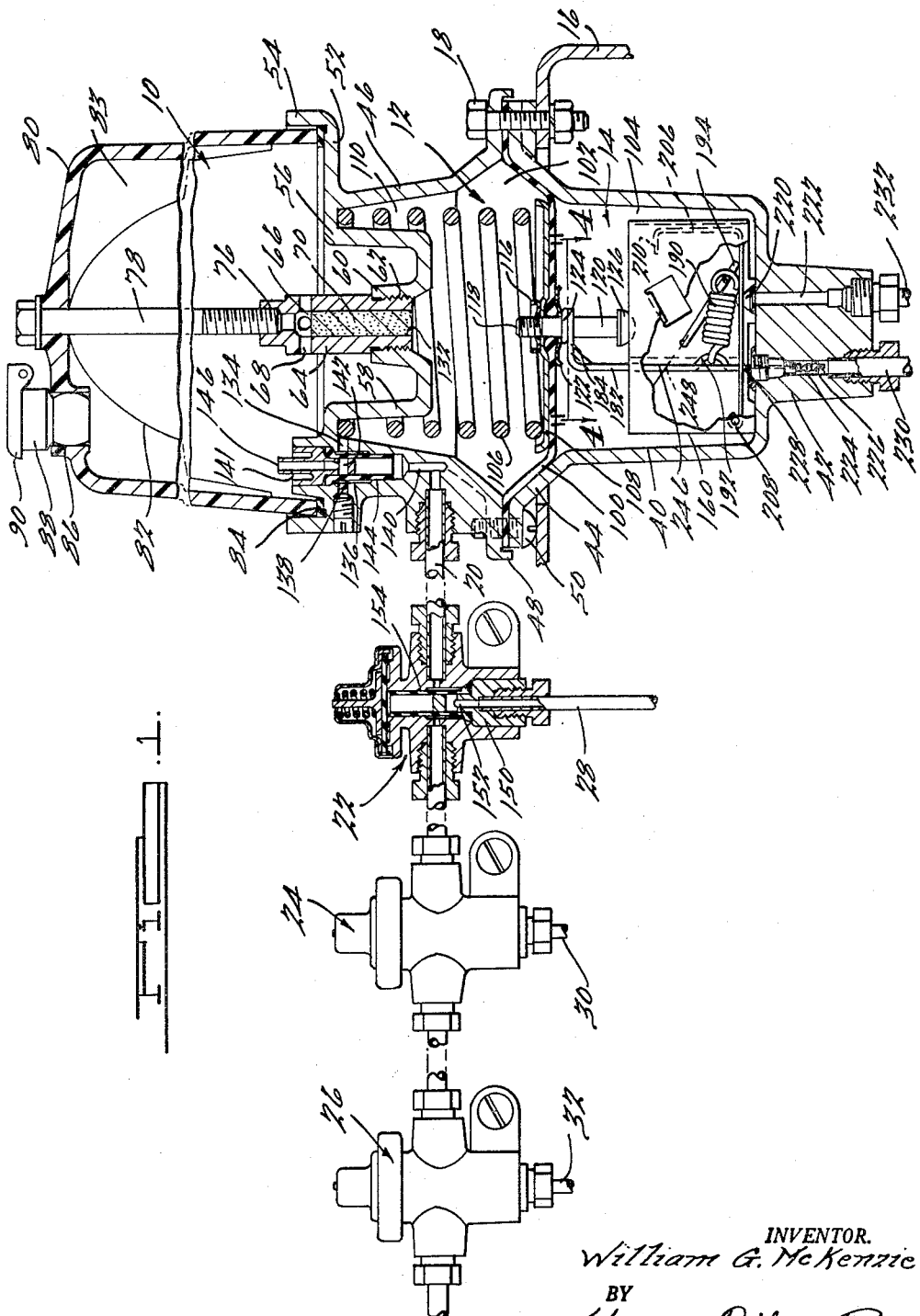
INVENTOR.
William G. McKenzie
BY
Barnes, Dickey & Pierce.
ATTORNEYS

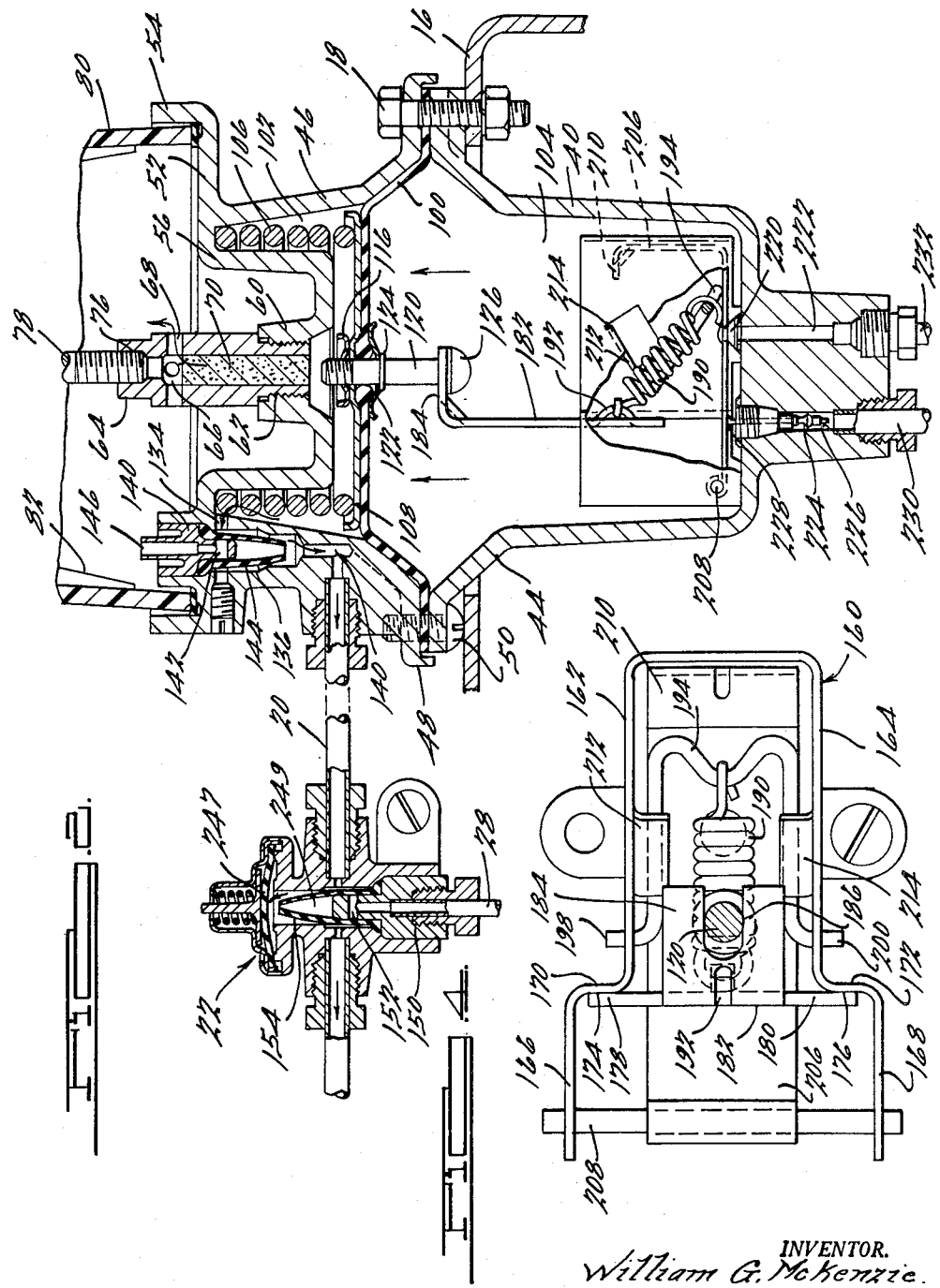

Aug. 25, 1964    W. G. McKENZIE    3,145,804
LUBRICATOR
Filed Nov. 24, 1961    4 Sheets-Sheet 3
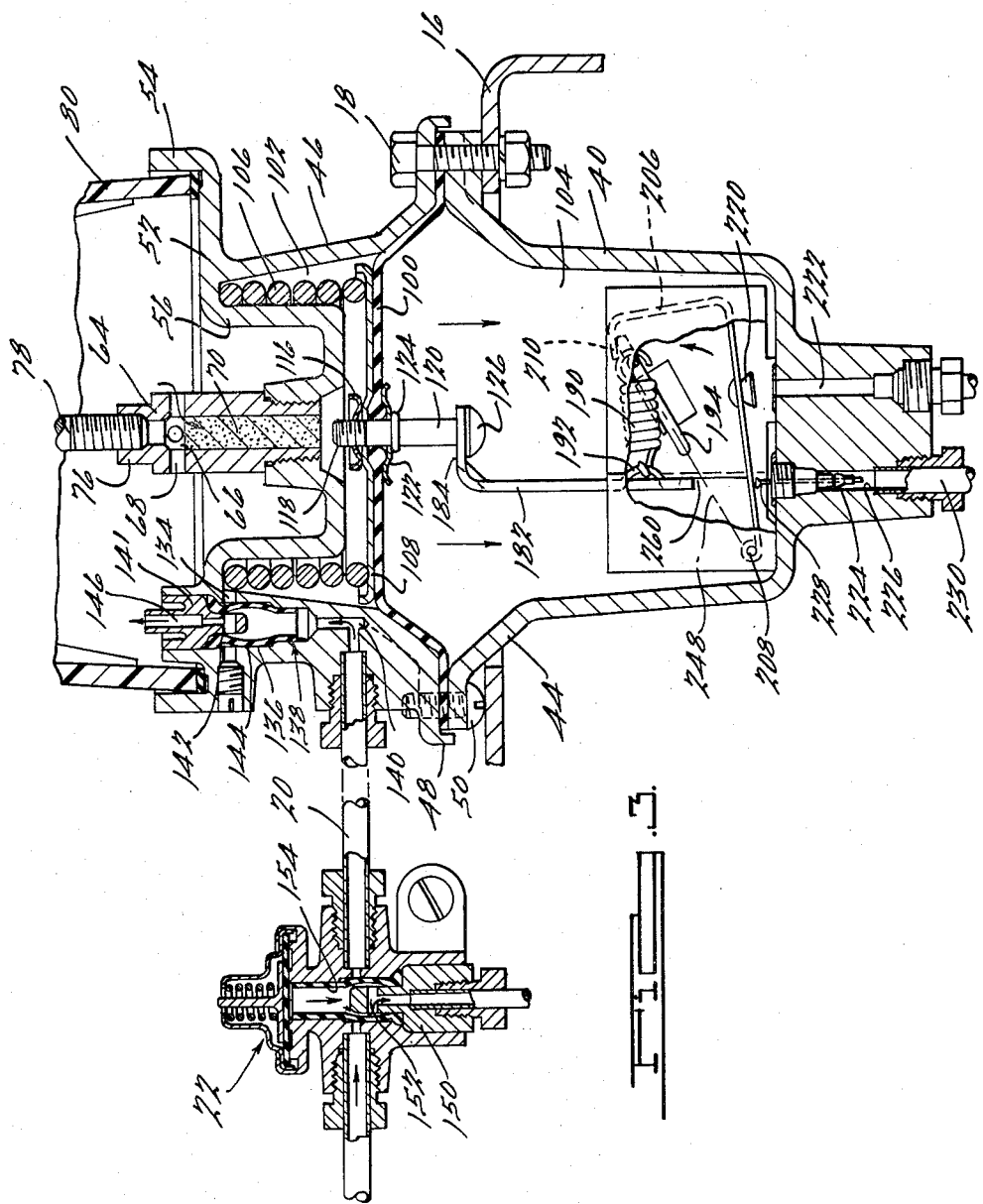
INVENTOR.
William G. McKenzie
BY
Harness, Dickey & Pierce
ATTORNEYS Aug. 25, 1964       W. G. McKENZIE       3,145,804
                    LUBRICATOR
Filed Nov. 24, 1961                    4 Sheets-Sheet 4
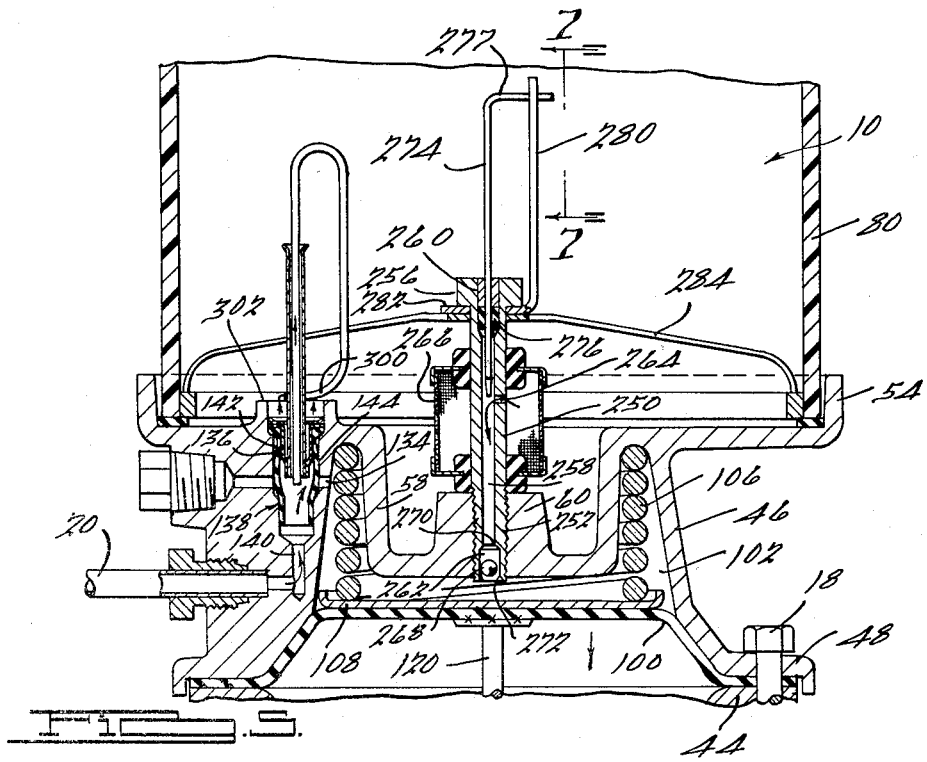
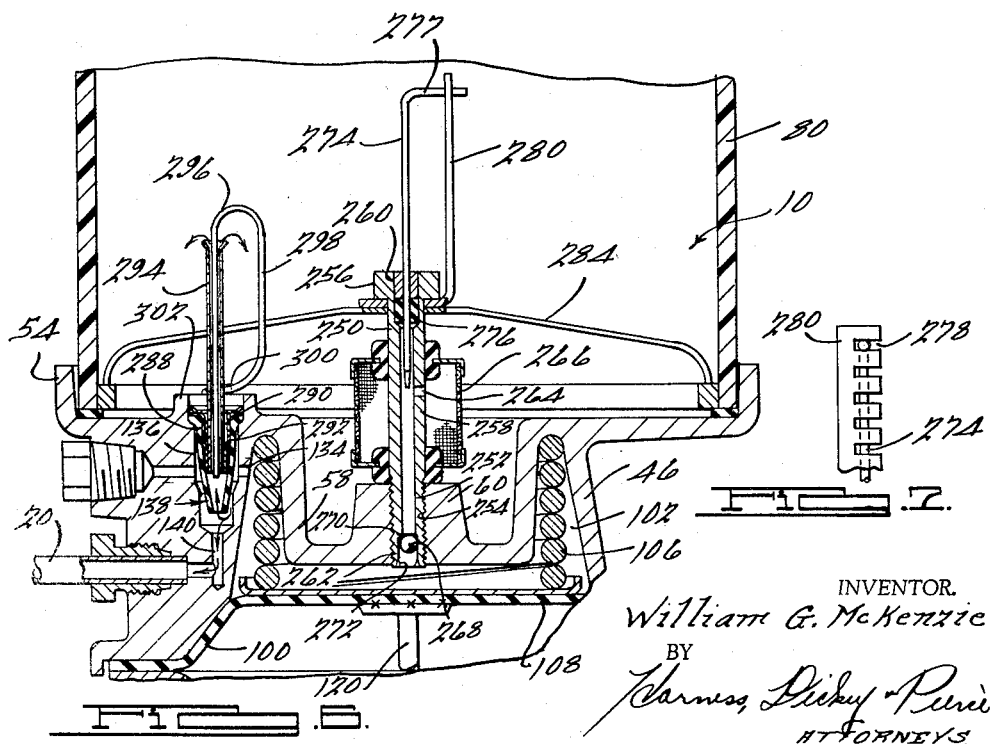
INVENTOR.
William G. McKenzie
BY
Karnes, Dickey & Pierce
ATTORNEYS

United States Patent Office 3,145,804
Patented Aug. 25, 1964

3,145,804
LUBRICATOR
William G. McKenzie, Racine, Wis., assignor to Walker Manufacturing Company, Racine, Wis., a corporation of Delaware
Filed Nov. 24, 1961, Ser. No. 154,788
15 Claims. (Cl. 184—29)

This invention relates to a fluid distribution system and more specifically to a lubricating oil distributing unit particularly adapted for automatically supplying lubricating oil to remote positions on industrial equipment at predetermined time intervals.

In many industrial applications it is necessary and desirable to provide substantially self-contained lubricating systems which are automatic in operation; yet, reliable and easy to maintain. One of the problems in industrial lubrication systems is providing convenient and inexpensive power means for actuating a lubricant distributing pump which may be used on varying types of industrial equipment. In the past, mechanical actuators which can be connected to drive means of industrial equipment on which the lubricating system is mounted have sometimes been used. Similarly, mechanical actuators are sometimes used which are directly actuated by a moving part of the industrial equipment to be lubricated. In the alternative, electric motors or the like may also be used to provide a source of power. In industrial applications, one of the most common sources of power is a high pressure air system which is used for a variety of purposes. Such systems are generally readily available and air conduits can be extended from existing air lines to remote positions very readily.

It is an object of this invention to provide a fluid distribution system in which the only power source, which is not a part of the fluid distribution system itself, is high pressure air such as commonly found in most manufacturing plants. A similar object is to provide a fluid distribution system which can utilize high pressure air over a wide range of pressure values so that no special apparatus need be provided to maintain a constant pressure air source. Another object of the present invention is to provide automatic pump control means which utilize flow characteristics of fluid being pumped to obtain repetitive pumping cycles and therefore require a minimum number of control parts. Still another object of the present invention is to provide a fluid distributing system and method which is automatic in operation and wherein fluid is distributed from a fluid reservoir at predetermined time intervals. A further object of the present invention is to provide a fluid distributing system which is compact in design and will require a minimum amount of space on industrial equipment with which it may be associated. A further object of the invention is to provide pumping means and pump control means having a minimum number of moving parts which are unaffected in operation by heavy vibrations commonly associated with industrial equipment.

Other objects and advantages of the present invention will be apparent from the following detailed description wherein reference is made to the accompanying drawings in which:

FIGURE 1 is a side elevational view, partly in section, of a fluid distribution system embodying the principles of the present invention;

FIGURE 2 is a side elevational view in section of a portion of the apparatus shown in FIGURE 1 in another operating position;

FIGURE 3 is a side elevational view in section of still another operating position of the apparatus shown in FIGURE 2;

FIGURE 4 is a sectional view taken along the line 4—4 in FIGURE 1;

FIGURE 5 is a partial side elevational view in section, illustrating an alternative embodiment of portions of the apparatus shown in FIGURE 1;

FIGURE 6 is a partial side elevational view in section, of the apparatus of FIGURE 5 in another operating position; and FIGURE 7 is a partial side elevational view of valve adjustment mechanism shown in FIGURE 6.

Referring now to the drawings, particularly FIGURE 1, a fluid distribution system is shown which has been particularly designed for use with industrial equipment; but embodying inventive concepts which may be equally applicable to other uses such as in vehicular applications. In general, the fluid distribution system comprises a fluid reservoir 10, a pumping unit 12 and a pump control unit 14 which are integrally associated with one another and form a fluid distributing unit that may be secured to a bracket 16, or the like, on or near a piece of industrial equipment by means of bolts 18 or the like. The fluid distribution system further comprises an outlet conduit 20 through which fluid in the reservoir 10 is distributed to and through a plurality of individual dispensing units 22, 24, 26 which may be connected in series as shown, or alternatively in parallel by the provision of multiple outlet conduits 20. The individual fluid distributing units 22, 24, 26 are in the form of meter ejectors which are adapted to periodically deliver metered amounts of lubricant to a plurality of bearings through the bearing conduits 28, 30, 32. The subject meter ejectors are described in detail in my copending application Serial No. 837,805, filed September 3, 1959, now Patent No. 3,068,959, dated December 18, 1962.

Specifically, the fluid distributing unit comprises a lower pump housing 40 having a valve base 42 and an outwardly flared rim portion 44. An upper pump housing 46 has a lower rim portion 48 which is adapted to overhang the lower pump housing rim 44 and be secured thereto by the bolts 18 and additional fastening elements 50. The upper portion of the upper pump housing has a radially outwardly extending flange portion 52 which terminates in an upwardly extending rim portion 54. The other end 56 of the flange 52 extends radially inwardly and downwardly to form a depending annulus 58. A boss 60 is centrally formed in the annulus 58 and provided with a threaded hole 62. A feed plug bushing 64 having a central elongated cavity 66 and a plurality of radially extending ports 68 is threadedly secured within the threaded hole 62. Fluid flow control means in the form of a feed plug 70 is fixedly secured within the central bore 66 below the radial passages 68. The plug is a sintered metal part which is commercially available in any size or shape having varying porosity characteristics. The length of the plug and its porosity are specified in order to obtain predetermined results as will be hereinafter described in more detail. The upper end of the feed plug bushing 64 is provided with a threaded hole 76 in which a bolt member 78 is threadedly received. A reservoir shell 80 formed from a clear plastic material or the like to enable visual inspection is secured on the flange 52 by the bolt 78 and a suitable filtering element 82 may be provided within the fluid reservoir 83 created thereby. The shell 80 is seated on a gasket 84 provided on the flange 52 to prevent leakage of fluid from the fluid reservoir. A supply port 86 is provided in the upper surface of the shell 80 and a funnel-type fitting 88 having a cover 90 is secured therein.

The pump means is a diaphragm type pumping mechanism comprising a flexible diaphragm 100 which is secured at its periphery between the lower flange 48 of the upper pump housing and the upper flange 44 of the lower pump housing. The diaphragm 100 forms a pumping chamber 102 with the upper pump housing and a control chamber 104 with the lower pump housing. The diaphragm 100 is biased downwardly by a spring element 106 which abuts a spring plate 108 at its lower end and the upper flange 52 at its upper end. The outer wall of the upper pump housing and the depending annulus 58 form a spring well 110. The spring plate 108 is secured in abutting engagement with the upper surface of the diaphragm 102 by a lock nut 116 which is threadably mounted on the upper end 118 of a diaphragm control bolt 120 forming part of pump control means to be hereinafter described. A backup plate 122 is secured to the other side of the diaphragm and is seated on stop means 124 on the bolt 120. A length of the bolt extends downwardly from the stop 124 and terminates in another stop means 126 for a purpose to be hereinafter described. The inlet to the pump chamber 102 from the fluid reservoir 83 is through the radial passages 68, the porous feed plug 70 and an opening 132 in the lower end of the central bore 66 in the feed plug bushing 64. The outlet passage from the pump chamber 102 is through a passage 134 formed in the side wall of the upper pump housing and communicating with a valve bore 136. A control valve 138 is mounted in the valve bore 136 and controls fluid flow from the outlet passage 134 to a passage 140 which communicates with the outlet conduit 29. The valve 138 is described in detail in my copending application Serial No. 841,500, filed September 22, 1959, now Patent No. 3,115,282, dated December 24, 1963. In general, the flow control valve 138 comprises a plug 141 having a T-shaped fluid passage 142 which is surrounded, in part, by a flexible sleeve element 144. The upper end 146 of the passage 142 opens into the fluid reservoir for a purpose to be hereinafter described. The meter injectors are similar in construction in that a plug element 150 is provided with a T-shaped passage 152 and a portion of the plug is surrounded by a flexible sleeve element 154.

Referring now to FIGURES 1 and 4, pump control means is provided in the pump control chamber 104 and comprises a rim member 160 having a first pair of opposite parallelly spaced side walls 162, 164 and a second pair of opposite parallelly spaced side walls 166, 168. The side walls are connected by transversely extending wall portions 170, 172 which provide slide guide surfaces 174, 176 against which side flanges 178 and 180 of a slide link element 182 are slidably mounted. The upper end of the slide link 182 is provided with a transversely extending flange portion 184 which has a slot 186 centrally formed therein. The slot 184 is adapted to slidably receive the shank of the bolt 120 and the upper surface of the flange 184 is adapted to abut the lower surface of the stop 124 while the lower surface of the flange 184 is adapted to abut the upper surface of the stop 126. The flanges 178, 180 of the slide link 182 are held in engagement with the slide surfaces 174, 176 by a spring element 190 which is secured at one end to a loop 192 struck out of the slide link, and at the other end to a toggle link 194. The ends 198, 200 of the toggle link 194 are pivotally mounted in the side walls 162, 164 and the toggle link is movable between a lowermost position shown in FIGURE 1 and an uppermost position shown in FIGURE 3. An L-shaped valve arm 206 is pivoted on a shaft 208 secured between the side walls 166, 168. An abutment surface 210 is formed on the end of the valve arm 206 by a reversely bent portion of the valve arm. The valve arm is reversely bent a sufficient distance to be located in the arcuate path of movement of the end of the toggle link 194 during movement of the toggle link from the lowermost position to the uppermost position. Tangs 212, 214 are struck out of each of the side walls 162, 164 to provide stops for the toggle link 194 in its uppermost position. As shown in FIGURE 1, the toggle link 194 abuts the upper surface of the valve arm 206 in its lowermost position. Similarly, the slide link 182 also abuts the upper surface of the valve arm 206 in the lowermost position. A valve member 220 is secured to the valve arm 206 and is adapted to close an outlet passage 222 in the lowermost positions of the toggle link 194 and the valve arm 206. A spring-biased inlet valve 224 is mounted in an inlet passage 226 in the valve base 42. The inlet valve 224 is normally biased to a closed position and is actuated to an open position by engagement of the lower surface of the valve arm 206 with a valve stem 228 which extends upwardly into the control chamber 104. A conduit 230 extends to a suitable high pressure source (not shown) such as is commonly found in manufacturing plants for operation of various industrial equipment. An outlet conduit 232 communicates with the atmosphere.

An alternative fluid flow control arrangement is shown in FIGURES 5 and 6 and comprises an elongated plug 250 which is threadably mounted at one end 252 in a threaded bore 254 in the boss 60. A flange 256 is formed in the other end of the plug and a central bore 258 communicates with a counter bore 260 on the upper end and a counter bore 262 on the lower end. A radial bore 264 connects the central bore 258 to the reservoir 10 through a concentrically mounted filter 266. A ball type valve 268 is reciprocably mounted in the lower counter bore 262 and is movable from an upper closed position in engagement with a valve seat 270 to a lower open position against a valve seat 272 formed by inturned portions of the end of the plug. The upper end of the plug is closed by an adjustable needle valve 274 which extends into the central bore through packing means 276. The upper end 277 of the needle valve is outwardly bent for latching engagement with a series of notches 278, shown in FIGURE 7, provided in a support bracket 280 which is fixedly mounted by a flange portion 282 between the plug flange 256 and a support element 284. The needle valve may be variably positioned within the bore 258 to control the rate of fluid flow therethrough. A control rod 286 replaces bolt 120 and is secured to the lower side of the diaphragm 100 by a suitable bending process.

Control valve 138 is of slightly different construction in that plug 141 is replaced by a shell 288 having a central cavity 290 and a plurality of radially extending bores 292. A tubular element 294 is fixedly received in the lower portion of cavity 290 and connects the chamber 136 with reservoir 10. A flow control valve 296 in the form of a rod extends within the tubular element and is supported by a reversely bent portion 298 which terminates in a horizontal leg 300 retained on the top of a boss 302 surrounding the valve chamber 136. The valve 296 is shown in its lowermost position providing a maximum restriction to flow of fluid through the tubular element. The valve 274 is shown in its uppermost position providing a minimum restriction to flow in the bore 258. The rest of the apparatus is identical to that previously described.

In operation with the fluid reservoir filled with a fluid such as lubricating oil and with the pump mechanism in the position shown in FIGURE 1, the pumping chamber 102 has been gradually filled with lubricating oil which seeps through the porous feed plug 70, or other flow control means, at a controlled rate. As shown in FIGURE 5, the feed plug 70 may be replaced by other suitable flow-control means such as an adjustable valve 274. By adjusting the length of the valve 274 within the bore 258, the length of the flow orifice and hence the flow rate can be controlled. When the chamber 102 has been filled with oil, the diaphragm 100 is in a fully downwardly extended position and the slide link 182 is in abutting engagement at one end with the upper surface of the valve arm 206 and at the other end with the stop 124. The valve arm 206 and toggle link 194 are in their lowermost positions so that the inlet valve 224 is actuated to open position by abutting engagement of the valve arm 206 with the valve control stem 228. The outlet port 222 is simultaneously closed by the outlet valve 220.

The flow valve 138 is in the position shown in FIGURE 1 with the flexible sleeve 144 in an unflexed position whereat flow from the pumping chamber 102 through the passage 134 to the passage 140 is prevented. In addition, the passage 142 is also closed from communication with the passage 140.

As high pressure air enters the control chamber 104 through the valve 224 from the conduit 230, a pressure force in the chamber is gradually built up which is sufficient to move the flexible pumping diaphragm 100 upwardly against the bias of the spring 106. As the diaphragm moves upwardly, oil is pumped from the pumping chamber 102 through the passage 134 and into the valve bore 136 surrounding the flexible sleeve 144. Pressure of the oil in the bore 136 collapses the lower end of the flexible sleeve 144, as shown in FIGURES 2 and 6, to permit oil to be delivered to the passage 140, the conduit 20 and the meter ejectors 22, 24, 26.

When the pump diaphragm moves to its uppermost position and oil is driven outwardly through the conduit 20, the flexible sleeves 154 in each of the meter ejectors are collapsed as shown in FIGURE 2 to permit a quantity of oil to flow upwardly into a storage chamber 247 and into the cavity 249 provided by the upper portions of the flexible sleeve. Simultaneously, the greater portion of the oil in the pumping cavity 102 is driven upwardly through the feed plug 70 and back into the fluid reservoir in the embodiment of FIGURE 2. In the apparatus illustrated in FIGURE 6, the ball valve 268 is moved upwardly to close the bore 258 and all of the fluid must pass through the passage 134. The excess fluid in chamber 136 flows upwardly through the tubular member 294 to the reservoir at a rate determined by the valve 296. As the flexible diaphragm moves upwardly during the initial portion of the pumping stroke, the stud 120 slides within the slot 186 provided in the slide link 182 so that no motion is imparted thereto. The provision of the aforementioned lost motion mechanism permits the air pressure in the lower cavity to be increased during the initial part of the pumping stroke and enables the air pressure to exert a continuous pumping action force until the pump stroke is completed. At the end of the pumping stroke the stop 126 engages the lower surface of the flange 184 of the slide link and moves the link upwardly along the slide surfaces 174, 176. The spring loop 192 and the adjacent end of the spring are similarly moved upwardly to and past the point 246 where the longitudinal axis 248 of the toggle link 194 intersects the slide link 182. At this time the end of the spring 190 attached to the loop 192 passes over center and the force component applied to the toggle link changes from a downwardly directed force to an upwardly directed force. The upwardly directed force component causes the toggle link to pivot upwardly to the position shown in FIGURE 3. As the toggle link 194 pivots upwardly, the outer end thereof engages the reversely bent flange 210 of the valve arm 206 and pivots the valve arm 206 upwardly about the pivot 208 until the toggle link 194 engages the stops 212, 214. Upward movement of the valve arm 206 moves the valve 220 upwardly to open the exhaust passage 222 and closes the inlet valve 224 by permitting the valve stem 228 to be urged upwardly to a closed position. In FIGURE 2, the pump control mechanism is shown with the parts in a position acquired just before the toggle linkage is pivoted and FIGURE 3 shows the pump control mechanism in the position acquired after the toggle linkage has been pivoted to its uppermost position.

Referring now to FIGURES 3 and 5, after the pumping diaphragm reaches its uppermost position and begins to return to its lowermost position, a negative pressure is created in the pumping chamber 102 and the control chamber 104 is at atmospheric pressure. The spring element 106 exerts a relatively small downwardly directed force in its compressed state at the end of the pumping stroke which is sufficient to move the pumping diaphragm 100 downwardly. As spring element 106 starts to rebound and move the flexible diaphragm 100 downwardly, a maximum negative pressure is created in the pumping chamber 102 which diminishes as the diaphragm moves downwardly. The negative pressure in the pumping chamber 102 creates a suction in the passage 134 and in chamber 136 which causes the flexible sleeve 144 to expand. Since the fluid pumped into the conduit 20 and the passage 140 is under pressure, a pressure differential exists between the oil in the passages and the oil in the reservoir which causes reverse flow through the passages 142 or 292. A pressure differential also exists between the oil reservoir and the pumping chamber 102 so that oil flows downwardly through the feed plug 70 or the bore 258 and into the pumping chamber. The rate of flow through the bore 258 can be controlled by adjustment of the valve 274. The oil from the reservoir gradually fills the pumping chamber as the diaphragm 100 is gradually moved downwardly. During the initial downward movement of the pumping diaphragm, the bolt 120 is slidably accommodated within the groove 186 in the link flange 184 to provide lost motion. When the stop 124 engages the upper surface of the flange 184, the link 182 is slidably displaced downwardly and moves the spring loop 192 and adjacent spring end downwardly below the intersection 260 of the longitudinal axis 248 of the toggle link 194 with the slide link as shown in FIGURE 3. When the end of the spring is moved below the intersection 260, the upward force component on the end of the toggle link is changed to a downward force component to cause downward rotation thereof into the lowermost position shown in FIGURE 1. When the toggle link 194 is pivoted to its lowermost position, the valve arm 206 is abuttingly engaged thereby and moved downwardly to its lowermost position with the valve 220 in sealing engagement with the end of the outlet passage 222. The valve arm abuttingly engages the valve stem 228 to open the valve 224 and admit high pressure air from the conduit 230 to the control chamber 104. In this manner the pumping cycle is automatically repeated at predetermined time intervals.

The time required to complete the upward stroke of the flexible diaphragm after the pumping chamber 102 has been filled with oil and the valve 224 has been opened depends primarily on the rate of flow of oil upwardly through the feed plug 70 or the tubular element 294 to and from the reservoir. The spring element 106 has a negligible effect on the pumping time as does the rate of displacement of oil to the meter ejectors. The volume of oil required to fill one of the meter ejectors is on the order of one one-thousandth of the volume of oil in the pumping chamber 102. Accordingly, the number of meter ejectors can be widely varied without substantially changing the basic timing cycle of the pumping mechanism. The time required to complete the upward pumping movement of the flexible diaphragm is not primarily dependent on the amount of pressure exerted by the air in the chamber 104 and wide variations in the air pressures in the chamber will not materially affect the pumping rate. The time required to complete the downward stroke of the flexible diaphragm is primarily dependent on the rate of oil flow from the reservoir into the pumping chamber through the porous plug 70 or the bore 258.

The pumping cycle time is, therefore, primarily a function of the flow rate of the majority of the oil in the pumping chamber to and from the reservoir. If a porous plug 70 is utilized, the flow rate can be varied by varying either the porosity or the length of the plug or both. If a variable orifice is used, the rate of flow and, consequently, the pumping cycle time can be varied by adjusting the orifice. The negative pressure created in the pumping chamber at the end of the pumping stroke is relatively low and the percent change in negative pressure during downward movement of the diaphragm is also relatively low so that a very slow rate of oil flow through the flow control means can be obtained for applications where fluid distribution is required only at intervals as long as an hour or more. On the other hand, if a more rapid timing cycle is desired, the porosity and/or length of the plug, or the size of the variable orifice can be changed to greatly increase the flow rate and substantially reduce the timing cycle.

The following example illustrates the wide range of air pressures in the control chamber which can be accommodated without materially affecting the timing cycle. A particular spring and flow control means calculated to fill the pumping cavity in 60 minutes and to evacuate the pumping cavity in 10 minutes with a pressure in the control chamber of 50 p.s.i. are provided. With a 100% increase in the pressure of the air in the control chamber from 50 p.s.i. to 100 p.s.i. the time required for the upward pumping stroke of the diaphragm 102 is 6 minutes. The downward stroke is controlled by spring 106 and the time therefor will be constant. Consequently, the percent variation in the complete cycle time is only 5.7%. Accordingly, the timing cycle of the fluid distribution system will not be materially affected by pressure surges or other fluctuations in an industrial plant central air system and may be connected directly to an industrial plant air system without concern that an exact predetermined air pressure will be continually supplied to the control chamber. If the variations in air pressures are so extreme that the fluid distribution cycle is materially affected, the time cycle can be readily corrected by changing the rate of flow of the fluid through the feed plug or variable orifice as hereinbefore described.

It should be noted the fluid distribution unit is extremely compact and may be readily located in remote areas on industrial equipment. Furthermore the pump control mechanism is integrated with and utilizes the flow of the fluid being pumped to provide automatic and repetitive distribution of controlled amounts of fluid at predetermined time intervals. The control mechanism is simple and inexpensive. In addition, the control mechanism has a minimum of moving parts, and the moving parts provided are not subject to damage by severe vibrations which are likely to be encountered in many industrial applications. Although the illustrative embodiment of the principal invention provides an extremely compact unit resulting in particularly advantageous results, it is contemplated that some variations in the structural details and arrangement of the parts can be made without departing from the principles of the invention. For example, the fluid reservoir could be remotely located and connected to the pumping chamber by a conduit or the like. Furthermore, varying types of flow control means can be utilized. The fluid may be distributed through and to a variety of types of fluid receptacles or fluid ejectors, and for a variety of purposes. It is intended that all obvious modifications, and other modifications, be included within the scope of the appended claims except insofar as limited by the prior art.

What is claimed is:

1. In a fluid distribution system, a fluid supply reservoir, a variable volume pumping chamber, pump means in said pumping chamber being movable between a first position providing a maximum volume in said pumping chamber to a second position providing a minimum volume therein, first conduit means to convey fluid from said reservoir to and from said pumping chamber, flow control means in said first conduit means to control the rate of flow through said conduit means to and from said pumping chamber, second conduit means to convey fluid from said pumping chamber to remote locations, pump actuating means to actuate said pump means from said first position to said second position when said pumping chamber has been filled by a predetermined amount of fluid flowing through said flow control means to evacuate said pumping chamber by forcing fluid therein through said first conduit means and said second conduit means, pump control means to deactivate said pump means when said second position is attained and to maintain said pump means deactivated until sufficient fluid flows from said reservoir through said flow control means and into said pump chamber to displace said pump means toward said first position, and said pump control means being responsive to movement of said pump means to actuate said pump actuating means when said pump means reaches said first position and said pumping chamber has been refilled to provide a continuous automatic fluid distribution cycle.

2. The fluid distribution system as defined in claim 1 and wherein said pump actuating means comprises air under pressure exerting forces on said pump means in a direction causing movement thereof from said first position to said second position.

3. The fluid distribution system as defined in claim 2 and wherein said pump control means comprises a high pressure air chamber, valve means to alternately admit high pressure air to said chamber and exhaust high pressure air from said chamber, and valve control means operable by said pump means during movement between said first position and said second position to admit high pressure air to said chamber when said pump means is in said first position and moving toward said second position and to exhaust air from said chamber when said pump means is in said second position and moving toward said first position.

4. The fluid distribution system as defined in claim 3 and wherein said valve control means comprises a valve control arm connected to said valve means and adapted to simultaneously actuate said valve means to admit high pressure air to said chamber or exhaust high pressure air from said chamber, said valve arm means being mechanically connected to said pump means and being actuable by said pump means at said first position and at said second positions to admit high pressure air to said chamber at said first position and exhaust high pressure air from said chamber and at second position, and lost motion means provided in said linkage and connecting said linkage to said pump means whereby said valve means is unactuated during movement of said pump from said first position to said second position and from said second position to said first position so that high pressure air is continuously admitted to said chamber when said pump means is in said first position and during movement to said second position and so that high pressure air is continuously exhausted from said chamber when said pump means is in said second position and during movement of said pump means to said first position.

5. The fluid distribution system as defined in claim 1 and wherein said flow control means comprises a porous feed plug mounted in said first conduit means and adapted to control the rate of flow of fluid to and from said reservoir in accordance with the degree of porosity and length thereof.

6. The fluid distribution system as defined in claim 1 and wherein said flow control means in said first conduit means comprises a variable orifice, and means to adjust said variable orifice to control the flow rate of fluid through said conduit means to obtain a predetermined time interval between repetitive evacuations of fluid from said pumping chamber.

7. In a fluid distribution system having passage means to receive and distribute fluid, a fluid supply reservoir, flexible diaphragm pumping means, housing means for said flexible diaphragm pumping means, said housing means being divided into a pumping chamber and a control chamber by said flexible diaphragm pumping means, means connecting said pumping chamber to said passage means, conduit means to supply fluid to and from said pumping chamber from said fluid reservoir, flow control means provided in said conduit means to control the rate of flow of fluid through said conduit to and from said pumping chamber, pressure exerting means operable in said control chamber to move said flexible diaphragm pumping means between a first position providing a maximum volume in said pumping chamber to a said second position providing a minimum volume therein whereby fluid is pumped to said system, control means to deactivate said pressure exerting means when said flexible diaphragm pumping means attains said second position and fluid in said pumping chamber has been evacuated therefrom, means to create a negative pressure in said pumping chamber after said flexible diaphragm pumping means has attained said second position to cause fluid to flow from said reservoir through said flow control means and into said pumping chamber to refill the pumping chamber, and said control means being actuated by said flexible pumping diaphragm when said first position is reattained to reactivate said force exerting means and repeat said pumping cycle.

8. The fluid distribution system as defined in claim 7 and wherein said control means comprises shaft means secured to said flexible diaphragm and extending into said control chamber, spaced stop means provided on said shaft means, link means slidably engaged with said shaft means and being engageable with one of said stop means in said first position and being engageable with the other of said stop means in said second position, said stop means being spaced from one another so as to cause engagement of said slide means with said stop means prior to the time that said diaphragm attains said first position or said second position so that said slide means is moved with said diaphragm during a portion of the movement of said diaphragm between said first position and said second position, toggle means pivotally mounted in said control chamber and being actually connected to said slide means, said toggle means being movable between a first position attained when said flexible pumping diaphragm is in said first position to a second position when said flexible pumping diaphragm attains its second position, and said toggle means being actuably connected to said pressure exerting means to actuate said pressure exerting means in said first position and deactivate said pressure exerting means in said second position.

9. The fluid distribution system as defined in claim 8 and wherein said pressure exerting means comprises a control arm pivotally secured in said control chamber and being pivotally movable between first and second control positions by abutting engagement with said toggle means in said first and second positions thereof.

10. In a fluid distribution system, the combination of a fluid reservoir, fluid passage means, a pumping chamber connected to said fluid passage means to deliver fluid thereto from said reservoir, a control chamber, a flexible diaphragm pumping means separating said pumping chamber and said control chamber, a first housing forming said control chamber, a second housing forming said pumping chamber, said first housing and said second housing being coaxially mounted and separated by said flexible pumping diaphragm, a fluid reservoir housing concentrically mounted on and above said pumping housing, passageway means connecting said fluid reservoir and said pumping chamber, flow control means provided in said passageway means to control the rate of flow of fluid between said reservoir and said pumping chamber, a spring well formed in the upper surface of said pumping chamber housing, a compression spring seated in said spring well and abuttingly engaging said flexible pumping diaphragm, said flexible pumping diaphragm being movable between a position of maximum pumping chamber volume to a position of minimum pumping chamber volume against the bias of said compression spring, air inlet valve means and air outlet valve means provided in said control chamber housing, a valve control arm pivotally mounted in said control chamber and operatively associated with each of said valves, said valve control arm being movable between a first position whereat said inlet valve is opened to admit high pressure air to said control chamber and said outlet valve is closed to prevent escape of high pressure air from said control chamber whereby said flexible pumping diaphragm is moved to said position of minimum pumping chamber volume to a second position whereat said inlet valve is closed and said outlet valve is opened to permit high pressure air in said control chamber to be exhausted therefrom whereby said flexible pumping diaphragm is movable to said position of maximum pumping chamber volume by said compression spring, a toggle link pivotally mounted in said control chamber and movable from a first position in abutting engagement with said valve control arm in its first position to a second position in abutting engagement with said valve control arm in its second position, slide means connected to said pumping diaphragm means in said control chamber and being movable therewith during portions of movement of said flexible pumping diaphragm between said first and said second position, and spring means connected to said slide means and said toggle linkage and being movable from a first over center position whereat said toggle link is maintained in abutting engagement with said valve arm in its first position to a second position whereat said toggle link is moved into abutting engagement with another portion of said valve arm in its second position, and lost motion means connecting said slide means to said flexible pumping diaphragm so that said valve arm is actuated only in said first and second positions.

11. In a fluid distribution system for periodically pumping fluid from a central reservoir to remote locations, pumping chamber means, passage means connecting said pumping chamber means to said remote locations, means to fill said pumping chamber means with fluid from said central reservoir, pump means, pump actuating means, said pump actuating means being responsive to movement of said pumping means as said pumping chamber means is filled with fluid to actuate said pump means when a predetermined maximum amount of fluid is in said pumping chamber to pump fluid therefrom to said remote location and to de-actuate said pump means when said fluid has been pumped from said chamber, and means to control the rate of flow of fluid to and from said pumping chamber to control the time intervals between successive actuations of said pumping means and delivery of fluid to said remote locations.

12. The method of periodically pumping a fluid from a central reservoir to remote locations and comprising the steps of: repetitively and automatically filling a pumping chamber with fluid from said central reservoir, periodically pumping fluid from said pumping chamber to remote locations when said pumping chamber has been filled with a predetermined amount of fluid, and controlling the rate of flow of fluid to and from said pumping chamber so that the time interval between successive pumpings is determined by the time required to fill said pumping chamber with fluid and to pump fluid therefrom.

13. The method of periodically pumping fluid from a central reservoir to remote locations and comprising the steps of: repetitively and automatically filling a pumping chamber with fluid from said central reservoir, periodically and automatically actuating pumping means when a predetermined maximum amount of fluid has accumulated in said pumping chamber, periodically and automatically pumping fluid from said chamber by actuation of said pumping means, de-actuating said pumping means when a predetermined amount of fluid has been pumped from said pumping chamber, and controlling the rate of flow of fluid to and from said pumping chamber to control the time interval between successive actuations of said pumping means and delivery of fluid to said remote locations.

14. In a fluid distribution system for periodically pumping fluid from a central reservoir to remote locations, a pumping chamber, passage means connecting said pumping chamber to said central reservoir and to said remote locations, pumping means provided in said pumping chamber, means to periodically and automatically actuate said pumping means when a predetermined maximum amount of fluid has accumulated in said pumping chamber, means to deactuate said pumping means when a predetermined amount of fluid has been pumped from said pumping chamber, and means controlling the rate of flow of fluid to and from said pumping chamber to control the time interval between successive actuations of said pumping means and delivery of fluid to said remote locations.

15. In a fluid distribution system, a fluid supply reservoir, a pumping chamber, pumping means provided in said pumping chamber, first conduit means to convey fluid between said reservoir and said pumping chamber, flow control means to control the rate of flow between said reservoir and said pumping chamber, second conduit means to convey fluid from said pumping chamber to remote locations, pump actuating means to actuate said pump means when said pumping chamber has been filled by a predetermined amount of fluid flowing through said flow control means to force fluid from said pumping chamber to said remote locations, pump control means to deactivate said pump actuating means after delivery of a predetermined amount of fluid to said remote locations and until sufficient fluid flows from said reservoir through said flow control means into said pump chamber to replace the fluid forced from said chamber by said pump means, and said pump control means being responsive to the accumulation of fluid in said pumping chamber to actuate said pump actuating means when said pumping chamber has been refilled to provide a continuous automatic fluid distribution cycle.

References Cited in the file of this patent
UNITED STATES PATENTS

| | | |
|---|---|---|
| 1,953,222 | Gordon | Apr. 3, 1934 |
| 2,051,290 | Davis | Aug. 18, 1936 |
| 2,950,684 | Bauerlein et al. | Aug. 30, 1960 |